US009330532B2

(12) United States Patent
Gagner et al.

(10) Patent No.: US 9,330,532 B2
(45) Date of Patent: May 3, 2016

(54) EXTERNAL EVALUATOR

(71) Applicant: WMS Gaming, Inc., Waukegan, IL (US)

(72) Inventors: Mark B. Gagner, West Chicago, IL (US); Jacek A. Grabiec, Chicago, IL (US); Timothy T. Gronkowski, Chicago, IL (US); Damon E. Gura, Chicago, IL (US); Budyanto Himawan, Palatine, IL (US)

(73) Assignee: Bally Gaming, Inc., Las Vegas, NV (US)

(*) Notice: Subject to any disclaimer, the term of this patent is extended or adjusted under 35 U.S.C. 154(b) by 42 days.

(21) Appl. No.: 14/075,974

(22) Filed: Nov. 8, 2013

(65) Prior Publication Data

US 2014/0066184 A1 Mar. 6, 2014

Related U.S. Application Data

(63) Continuation of application No. 13/384,067, filed as application No. PCT/US2010/051875 on Oct. 7, 2010, now Pat. No. 8,597,112.

(60) Provisional application No. 61/249,822, filed on Oct. 8, 2009.

(51) Int. Cl.
*G06F 17/00* (2006.01)
*G07F 17/32* (2006.01)

(52) U.S. Cl.
CPC ............ *G07F 17/3225* (2013.01); *G07F 17/32* (2013.01); *G07F 17/3244* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 5,224,706 A | 7/1993 | Bridgeman et al. | |
| 5,541,981 A | 7/1996 | Lynn | |
| 6,371,852 B1 * | 4/2002 | Acres | G07F 17/3239 463/16 |

(Continued)

FOREIGN PATENT DOCUMENTS

| | | |
|---|---|---|
| WO | WO-2011044397 | 4/2011 |

OTHER PUBLICATIONS

"PCT Application No. PCT/US10/51875 International Preliminary Report on Patentability", Nov. 16, 2011 , 4 pages.

(Continued)

*Primary Examiner* — Paul A D'Agostino
(74) *Attorney, Agent, or Firm* — DeLizio Law, PLLC

(57) ABSTRACT

Although wagering games and wagering game machines provide significant entertainment and excitement, outcomes of wagering games can be used to provide entertainment and excitement external to the wagering game machines and even distinct and/or separate from the wagering games that generate the outcomes. A wagering game machine can communicate wagering game outcome data to a machine that is external to the wagering game machine for evaluation of the wagering game outcome data ("external evaluator"). The external evaluator can evaluate the wagering game outcome data against rules and/or criteria that lead to an exciting and entertaining event separate and/or distinct from the wagering game itself. Evaluating wagering game outcome data separate from the hosting wagering game machine allows a variety of events to be associated with game outcomes and allows for events to adapt to a dynamic environment and/or to player preferences.

22 Claims, 9 Drawing Sheets

(56) References Cited

U.S. PATENT DOCUMENTS

| | | | | |
|---|---|---|---|---|
| 7,153,211 | B2 | 12/2006 | Campaigne | |
| 7,311,603 | B2 * | 12/2007 | Walker | G07F 17/32 273/138.2 |
| 7,503,851 | B2 * | 3/2009 | Walker | G07F 17/32 463/25 |
| 8,262,445 | B1 | 9/2012 | Spigner | |
| 9,098,964 | B2 * | 8/2015 | Kelly | G07F 17/32 |
| 2003/0003990 | A1 | 1/2003 | Von Kohorn | |
| 2003/0109306 | A1 | 6/2003 | Karmarkar | |
| 2004/0204226 | A1 | 10/2004 | Foster et al. | |
| 2004/0204229 | A1 | 10/2004 | Walker et al. | |
| 2005/0037837 | A1 * | 2/2005 | Rowe | G06Q 30/0209 463/25 |
| 2005/0070356 | A1 | 3/2005 | Mothwurf et al. | |
| 2005/0071023 | A1 * | 3/2005 | Gilliland | G07F 17/3265 700/91 |
| 2005/0096121 | A1 * | 5/2005 | Gilliland | G07F 17/32 463/20 |
| 2005/0176494 | A1 | 8/2005 | Thomas | |
| 2006/0058099 | A1 | 3/2006 | Soukup et al. | |
| 2006/0063580 | A1 | 3/2006 | Nguyen et al. | |
| 2006/0073887 | A1 * | 4/2006 | Nguyen | G07F 17/3258 463/27 |
| 2006/0100019 | A1 | 5/2006 | Hornik et al. | |
| 2006/0111170 | A1 * | 5/2006 | Hornik | G07F 17/32 463/16 |
| 2006/0279044 | A1 | 12/2006 | Pacey | |
| 2007/0026941 | A1 * | 2/2007 | Block | G07F 17/34 463/29 |
| 2007/0060292 | A1 * | 3/2007 | Peterson | G07F 17/3244 463/20 |
| 2007/0218974 | A1 * | 9/2007 | Patel | G07F 17/3244 463/20 |
| 2008/0096625 | A1 | 4/2008 | Thomas et al. | |
| 2009/0023494 | A1 | 1/2009 | Colletti et al. | |
| 2009/0093299 | A1 | 4/2009 | Acres | |
| 2009/0124336 | A1 | 5/2009 | Lyons et al. | |
| 2009/0124368 | A1 | 5/2009 | Lyons et al. | |
| 2009/0131143 | A1 * | 5/2009 | Kelly | G07F 17/32 463/19 |
| 2009/0131175 | A1 | 5/2009 | Kelly et al. | |
| 2009/0149250 | A1 | 6/2009 | Middleton | |
| 2009/0181776 | A1 | 7/2009 | Deng | |
| 2009/0186699 | A9 | 7/2009 | Kelly | |
| 2009/0270157 | A1 | 10/2009 | Christensen | |
| 2009/0310027 | A1 | 12/2009 | Fleming | |
| 2010/0056248 | A1 | 3/2010 | Acres | |
| 2010/0120494 | A1 | 5/2010 | DeWaal et al. | |
| 2010/0261521 | A1 | 10/2010 | Oatman et al. | |
| 2010/0317424 | A1 | 12/2010 | Hornik et al. | |
| 2011/0105218 | A1 | 5/2011 | Anderson et al. | |
| 2012/0115592 | A1 | 5/2012 | Gagner et al. | |

OTHER PUBLICATIONS

"PCT Application No. PCT/US10/51875 International Search Report", Dec. 1, 2010 , 8 pages.

U.S. Appl. No. 13/384,067, Office Action, Nov. 2, 2012 , 11 pages.

"U.S. Appl. No. 13/384,067 Office Action", Mar. 15, 2013 , 8 pages.

* cited by examiner

EXTERNAL EVALUATOR

RELATED APPLICATIONS

This application is a continuation that claims priority of U.S. patent application Ser. No. 13/384,067, which is a 371 application of PCT/US10/51875 filed on Oct. 7, 2010. The international patent application PCT/US10/51875 claims benefit of U.S. Provisional Application No. 61/249,822, which was filed Oct. 8, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to wagering game systems, and more particularly to wagering game systems that externally evaluate wagering game outcome data.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which:

FIG. 2 depicts a flowchart of example operations for evaluating wagering game outcome data against a criterion that is distinct from a wagering game that generates the wagering game outcome data.

FIG. 3 depicts example operations that continue from the flowchart depicted by FIG. 2.

FIG. 4 depicts example operations that continue from FIG. 2.

DESCRIPTION OF THE EMBODIMENTS

The description that follows includes exemplary systems, methods, techniques, instruction sequences, and computer program products that embody techniques of the present inventive subject matter. However, it is understood that the described embodiments may be practiced without these specific details. For instance, although examples refer to performing operations on backend systems, operations can be performed on handheld devices (e.g., cellular phones). In other instances, well-known instruction instances, protocols, structures, and techniques have not been shown in detail in order not to obfuscate the description.

Introduction

Although wagering games and wagering game machines provide significant entertainment and excitement, outcomes of wagering games can be used to provide entertainment and excitement external to the wagering game machines and even distinct and/or separate from the wagering games that generate the outcomes. A wagering game machine can communicate wagering game outcome data to a machine that is external to the wagering game machine for evaluation of the wagering game outcome data ("external evaluator"). The external evaluator can evaluate the wagering game outcome data against rules and/or criteria that lead to an exciting and entertaining event separate and/or distinct from the wagering game itself. Evaluating wagering game outcome data separate from the hosting wagering game machine allows a variety of events to be associated with game outcomes and allows for events to adapt to a dynamic environment and/or to player preferences. In addition, an external evaluator allows for additional valuable functionality, including independent verification of wagering game machines.

Figure 1:
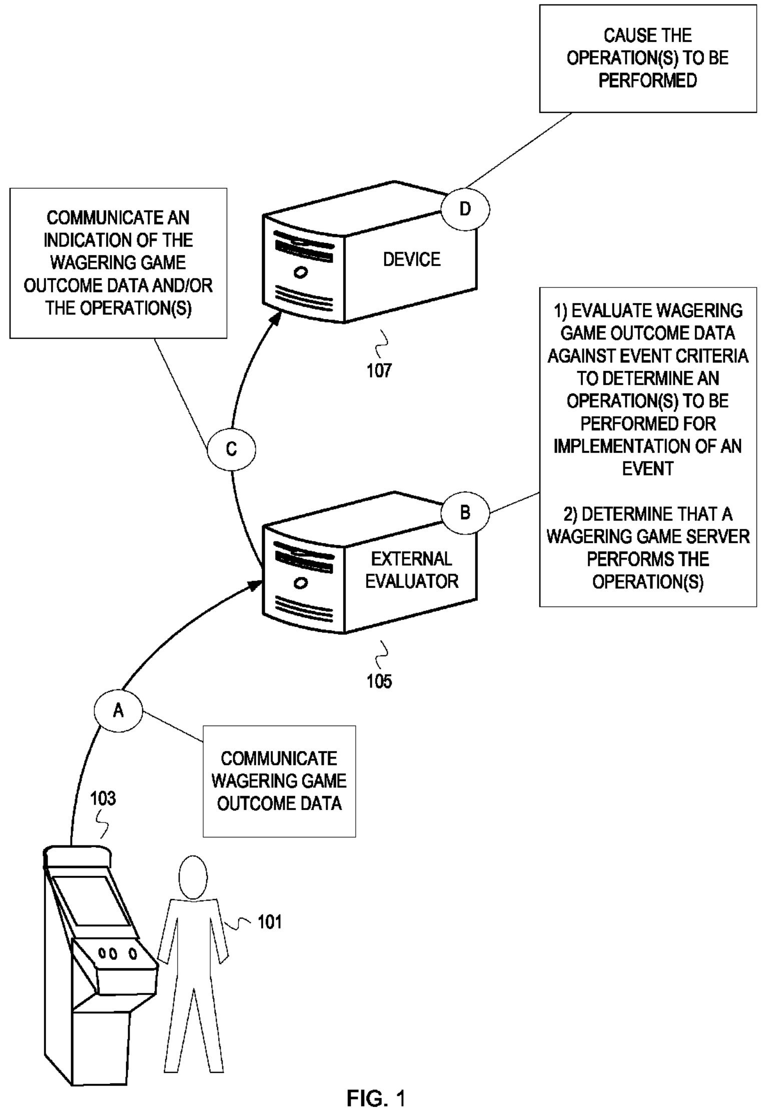
FIG. 1 depicts a conceptual diagram of an example system with an external evaluator evaluating wagering game outcome data.

FIG. 1 depicts a conceptual diagram of an example system with an external evaluator evaluating wagering game outcome data. In the illustration of FIG. 1, a wagering game establishment network comprises a wagering game machine 103 and an external evaluator. A device 107 may also be a part of the wagering game establishment network (e.g., another wagering game machine, a server, a device controller, etc.), or can be an independent device registered with the wagering game establishment (e.g., a cellular phone, a personal data assistant, a handheld computer, etc.). The wagering game machine 103, the external evaluator 105, and the device 107 are communicatively coupled (e.g., wired network, wireless network, a mixed network, etc.). FIG. 1 also depicts a player 101 at the wagering game machine 103. This illustration depicts several example stages to aid in understanding possible operations that can be performed in a system with an external evaluator, although embodiments are not limited to the order and particular operations illustrated.

At a stage A, the wagering game machine 103 communicates wagering game outcome data to the external evaluator

105. Despite the illustration, the wagering game machine 103 may be a portable device. The wagering game outcome data indicates a wagering game and an outcome. Examples of an outcome include symbols resulting from a spin on a slot game, cards dealt in a video poker game, etc. Examples of outcome data include numbers from a random number generator, values that represent particular cards or symbols, a reel value and a symbol value, references to graphical data, vectors, etc. Wagering game outcome data is not limited to indicating the wagering game and outcome. Wagering game outcome data can also indicate a paytable identifier, player account, denomination, wager amount, time of the outcome, etc.

At stage B, the external evaluator 105 evaluates the wagering game outcome data and acts accordingly. The external evaluator 105 has access to a set of rules and/or event criteria. The external evaluator 105 evaluates the wagering game outcome data against the set of rules and/or criteria to determine one or more operations to be performed to implement an event. The set of rules and/or criteria can indicate various aspects of wagering game outcome data (e.g., certain symbols, win amounts, wager amounts, consecutive outcomes, etc.) to be satisfied for an event to occur. The set of rules and/or criteria may also indicate aspects of player data to be satisfied for the event to occur, for multiple events to occur, etc. For example, the set of rules and/or criteria for an event may indicate that an event will be triggered if a player, who has wagered an amount greater than $500 and who is staying within the casino, attains a wagering game outcome of a particular symbol combination. Examples of an event include an environmental effect event (e.g., a particular graphic and audio), entry into a separate wagering game (e.g., entry into a tournament or lottery), a hospitality event (e.g., submission of a drink order), activity in a separate wagering game (e.g., spin of a community funded slot wagering game, determining an outcome of an outcome that includes an overloaded symbol), etc.

If the set of rules and/or criteria are satisfied for an event, then the external evaluator 105 determines one or more machines to perform one or more operations that implement the event. In FIG. 1, the external evaluator 105 determines that a wagering game server (i.e., the device 107) performs the one or more operations.

At stage C, the external evaluator 105 communicates an indication of the wagering game outcome data and/or the operation(s) to implement the event to the device 107. For instance, the external evaluator 105 transmits several data units that indicate a reference to the wagering game outcome data and a value that indicates the event (e.g., an event code). Embodiments can utilize a variety of techniques to communicate an indication of the wagering game outcome data and/or the operation(s) to implement the event (e.g., literally embed the wagering game outcome data in packets, transmit a key for the data and a network address of a store that hosts the data, transmit an event code, transmit a name of an operation, etc.).

At stage D, the device 107 causes the operation(s) that implement the event to be performed.

Figure 2:
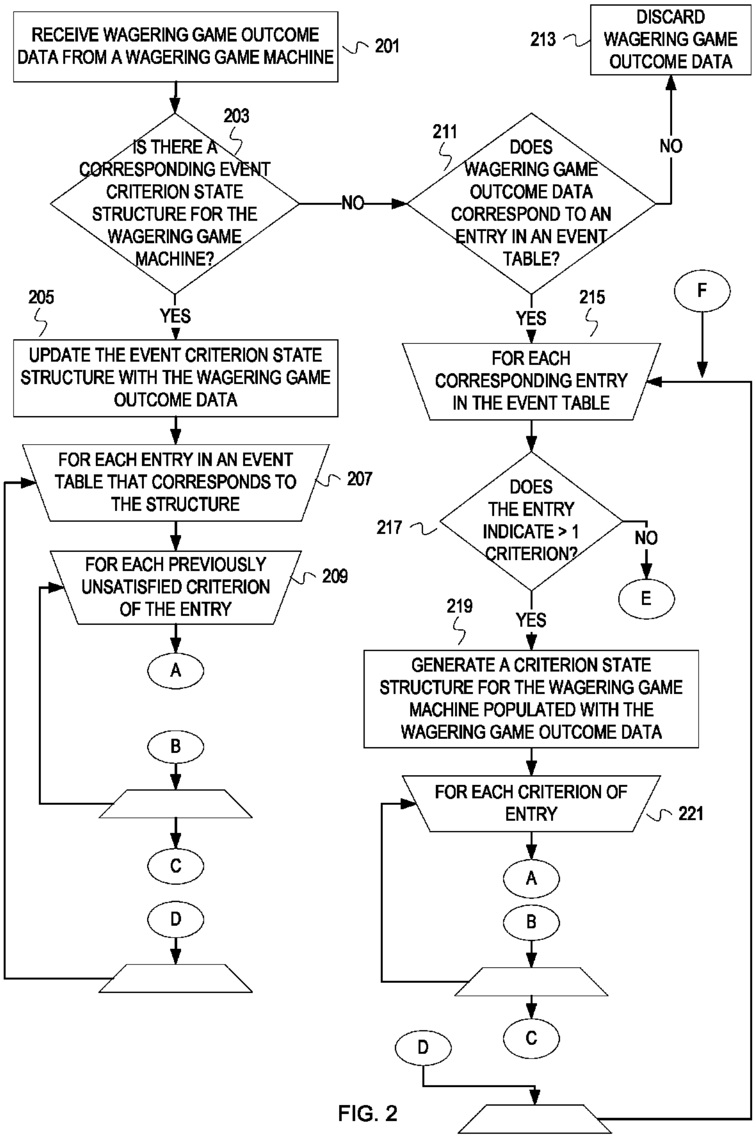
FIGS. 2-4 depict flowcharts of example operations for evaluating wagering game outcome data.
Figure 3:
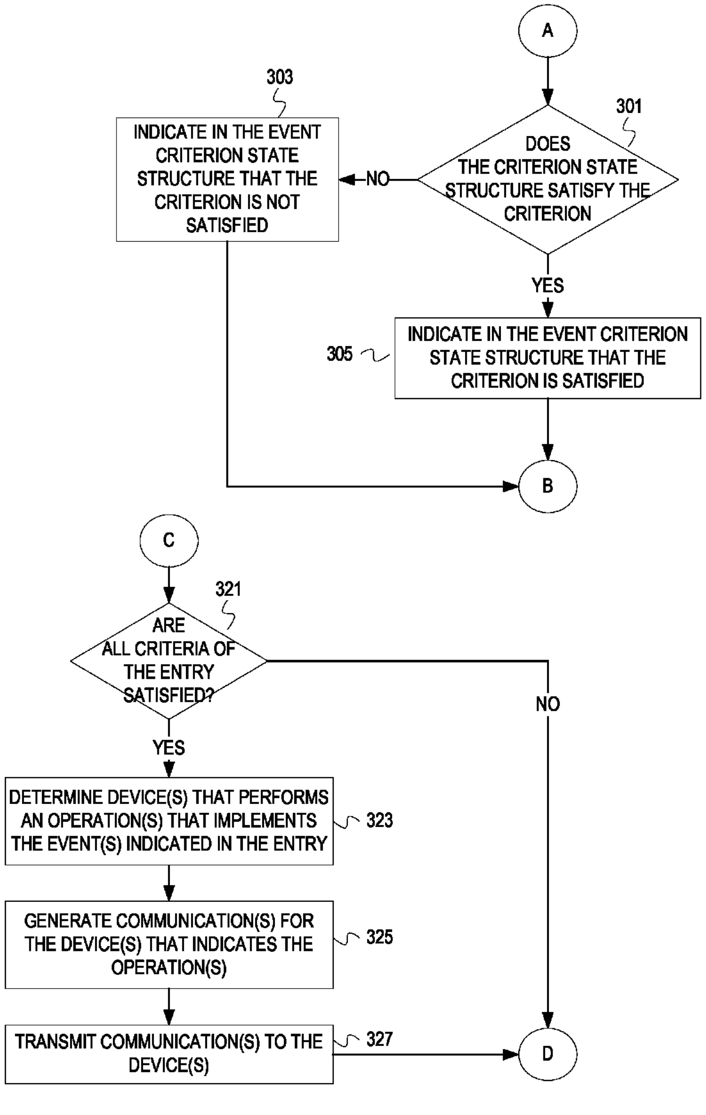
Figure 4:
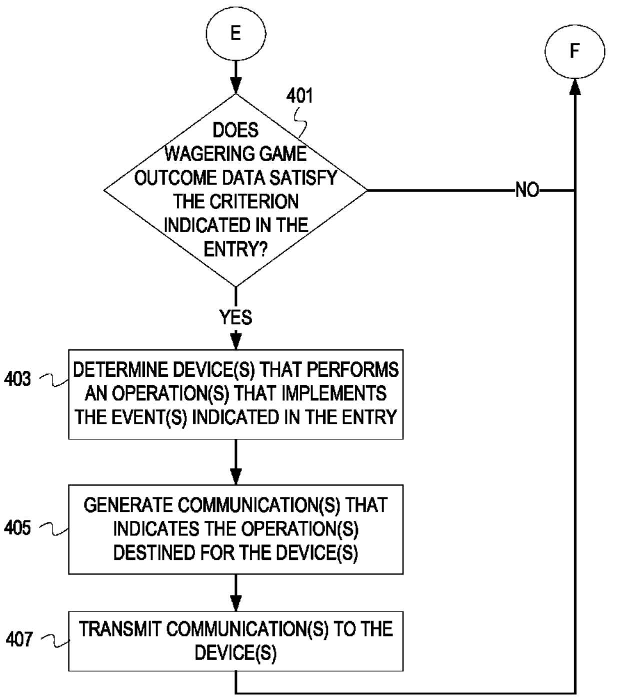

FIGS. 2-4 depict flowcharts of example operations for evaluating wagering game outcome data. FIG. 2 depicts a flowchart of example operations for evaluating wagering game outcome data against a criterion that is distinct from a wagering game that generates the wagering game outcome data. At block 201, wagering game outcome data is received from a wagering game machine.

At block 203, it is determined if there is an event criterion state structure that corresponds to the wagering game machine. For instance, an external evaluator accesses a table to determine if an event criterion state structure has been instantiated for the wagering game machine that generated the received wagering game outcome data. Events can have criteria satisfied in one instance and can have criteria that can be satisfied over time with multiple outcomes. The event criterion state structure tracks state of satisfaction of event criteria (e.g., a first criterion has been satisfied, but a second has not been satisfied) on a wagering game machine basis. If an event criterion state structure has been instantiated for the wagering game machine, then control flows to block 205. Otherwise, control flows to block 211.

At block 211, it is determined if the wagering game outcome data corresponds to an entry in an event table. For instance, the external evaluator can determine if the wagering game outcome data indicates a game type (e.g., video poker, video slot, etc.) that indexes or keys an entry in the event table. Although the illustration refers to a table, embodiments are not limited to a table structure and can utilize any of a variety of data structures and hardware to associate an event with a criterion or criteria. In addition, multiple events can index into or be associated with a same set of rules and/or criteria. If the wagering game outcome data corresponds to an entry in the event table, then control flows to block 215. If not, then control flows to block 213.

At block 213, the wagering outcome data is discarded. Embodiments are not, however, required to discard the wagering game outcome data. Embodiments can use the wagering game outcome data to update logs, track outcomes, compute statistics, etc.

At block 215, a loop begins for each entry in the event table that corresponds to the wagering game outcome data.

At block 217, it is determined if the corresponding entry indicates more than one criterion. If the corresponding entry indicates more than one criterion, then control flows to block 219. If the corresponding entry does not indicate more than one criterion, then control flows to block 401 of FIG. 4.

FIG. 4 depicts example operations that continue from FIG. 2. At block 401, it is determined if the wagering game outcome data satisfy the criterion indicated in the entry. If the wagering game outcome data do not satisfy the criterion, then control flows to block 215 for the next entry in the event table, if any. If the wagering game outcome data satisfy the criterion, then control flows to block 403. Examples of a criterion include a ratio of wins to losses over a certain number of recent plays, a threshold lifetime wager amount, total time played in a 10 hour period, particular symbols attained in a game, particular games played, number of different games played, new games played, drinks ordered while playing a particular game, etc.

At block 403, a device(s) that performs an operation(s) that implements the event(s) indicated in the entry is determined. For instance, an external evaluator determines that operations to implement a celebration event are performed by an audio controller and a LED display. As another example, the external evaluator determines a network address of a server that implements order submission and account debiting operations to implement a hospitality event.

At block 405, a communication(s) that indicates the operation(s) is generated. The communication is for the device(s) determined to perform the operation(s). As examples, an external evaluator can construct a message with operation codes or name of procedures or functions to be executed by the device(s). An external evaluator can also call a function or procedure that populates a template message with operation codes or API calls, and a network address of the device(s) that will use the operation codes or make the API calls.

At block 407, the communication is transmitted to the device(s). An external evaluator can transmit the communication as a network packet, in an e-mail message, incidental to executing an API function, by passing the communication to a process that handles transmission, etc. Control flows from block 407 to block 215 for processing of the next entry, if any.

Returning to FIG. 2, if the entry indicated more than one criterion, then a criterion state structure is generated for the wagering game machine, and is populated with relevant data of the wagering game outcome data at block 219. Embodiments can populate the structure with all of the wagering game outcome data, a reference to the wagering game outcome data, a reference to a portion of the wagering game outcome data, etc. Embodiments can generate the criterion state structure based on all criteria for an entry, for example, by calling a function aware of the criteria. Embodiments can also create an initial criterion state structure with a record or field for the first encountered criterion, and update the structure as more criterion are encountered. Embodiments can also create the criterion state structure with an index or reference into the corresponding entry of the event table.

Within the loop initiated at block 215 another loop begins at block 221 for each criterion of the entry. For each criterion of the corresponding entry, operations indicated at blocks 301, 303, and 305 of FIG. 3 are performed.

FIG. 3 depicts example operations that continue from the flowchart depicted by FIG. 2. At block 301, it is determined if the criterion state structure satisfies the criterion. If the criterion state structure does not satisfy the criterion, then control flows to block 303. If the criterion state structure satisfies the criterion, then control flows to block 305. For instance, an external evaluator walks through the criterion state structure to determine if data satisfies the criterion. In another example, the external evaluator accesses the criterion state structure in accordance with a schema or map.

At block 303, it is indicated in the event criterion state structure that the criterion is not satisfied. For example, the external evaluator can update a flag that indicates which field in the criterion state structure does not satisfy the criterion. The external evaluator can also update the structure to indicate the criterion is satisfied and when it was satisfied. Control flows from block 303 to block 221 of FIG. 2 for the next criterion of the entry, if any.

At block 305, it is indicated in the event criterion state structure that the criterion is satisfied. For example, the external evaluator can update a flag that indicates which field(s) satisfies the criterion. The external evaluator can also update a global flag or value in addition to or instead of a field flag/value to indicate that the criterion is satisfied. Control flows from block 303 to block 221 of FIG. 2 for the next criterion of the entry, if any.

After the operations indicated at blocks 301, 303, and 305 are performed for each criterion of the entry, control flows to block 321. Operations indicated at blocks 321, 323, 325, and 327 are performed for each entry in the event table.

At block 321, it is determined if all criteria of the entry are satisfied. If all criteria of the entry are satisfied, then control flows to block 323. If not, then control flows to block 215 for the next entry, if any.

At block 323, a device(s) that performs an operation(s) that implements the event(s) indicated in the entry is determined. For instance, an external evaluator determines that operations to implement a celebration event are performed by an audio controller and a LED display. As another example, the external evaluator determines a network address of a server that implements order submission and account debiting operations to implement a hospitality event.

At block 325, a communication(s) that indicates the operation(s) is generated. The communication is for the device(s) determined to perform the operation(s). As examples, an external evaluator can construct a message with operation codes or name of procedures or functions to be executed by the device(s). An external evaluator can also call a function or procedure that populates a template message with operation codes or API calls, and a network address of the device(s) that will use the operation codes or make the API calls.

At block 327, the communication is transmitted to the device(s). An external evaluator can transmit the communication as a network packet, in an e-mail message, incidental to executing an API function, by passing the communication to a process that handles transmission, etc. Control flows from block 327 to block 215 for processing of the next entry, if any.

Returning to FIG. 2, if control flowed from block 203 to block 205, then the event criterion state structure is updated with the wagering game outcome data.

At block 207, a loop begins for each entry in an event table that corresponds to the structure. For instance, the criterion state structure can indicate an index or reference to the entry in the event table.

At block 209, a loop begins for each previously unsatisfied criterion of the entry. For instance, an external evaluator examines the criterion state structure to determine unsatisfied criteria. From block 209, control flows to block 301 of FIG. 3. Control from block 303 or block 305 flows back to block 209, if there is another unsatisfied criterion.

After the loop initiated at block 209, control flows to block 321 of FIG. 3. Control flows from block 321 or block 327 back to block 207 if there is another entry that corresponds to the criterion state structure.

In addition to the examples already provided, an external evaluator allows for overloaded symbols, a portal progressive, independent auditing, etc. To illustrate overloaded symbols and a portal progressive game, a same combination of symbols can have different results for different games. Assume three cherries results in a reward 2× the wager for a base wagering game, and results in a non-monetary virtual economy type reward in a portal progressive game (e.g., the three cherries index into a different paytable accessible to the external evaluator). The external evaluator or a machine that handles the portal progressive game can then communicate the result (e.g., the virtual economy reward) to the electronic wagering game machine that hosts the base wagering game in a portal instantiated on the electronic wagering game machine. The external evaluator can also be used to independent audit electronic wagering game machines. For instance, an external evaluator can host a shadow paytable for a wagering game. An electronic wagering game machine can report wagering game outcome data to the external evaluator and a separate independent machine, for example a game server. The game server can determine a reward based on the outcome data. Likewise, the external evaluator can determine a reward with the outcome data and the shadow paytable. The electronic wagering game machine can be audited by comparing the rewards computed by the game server and the external evaluator. As another example, the wagering game machine can communicate wagering game outcome data with awards to a backend machine that maintains an auditing log of the wagering game outcome data with awards (e.g., hourly, daily, after each outcome or event, etc.). The wagering game machine can also report the wagering game outcome data to an external evaluator that determines events/awards with a shadow paytable. The external evaluator can then communicate the events/awards determined with the shadow paytable associated with an identifier of the wagering game machine to the backend machine, which will maintains an auditing log for the external evaluator. The backend machine can compare auditing logs of the wagering game machines to the auditing logs of the external evaluator to independently and securely audit wagering game machines.

Embodiments are not limited to evaluating wagering game outcome data from individual machines. Embodiments can evaluate wagering game outcome data from multiple wagering game machines, and an event can be triggered based on an aggregate of wagering game outcome data satisfying event criteria or event criteria being satisfied by wagering game outcome data from different wagering game machines.

Figure 5:
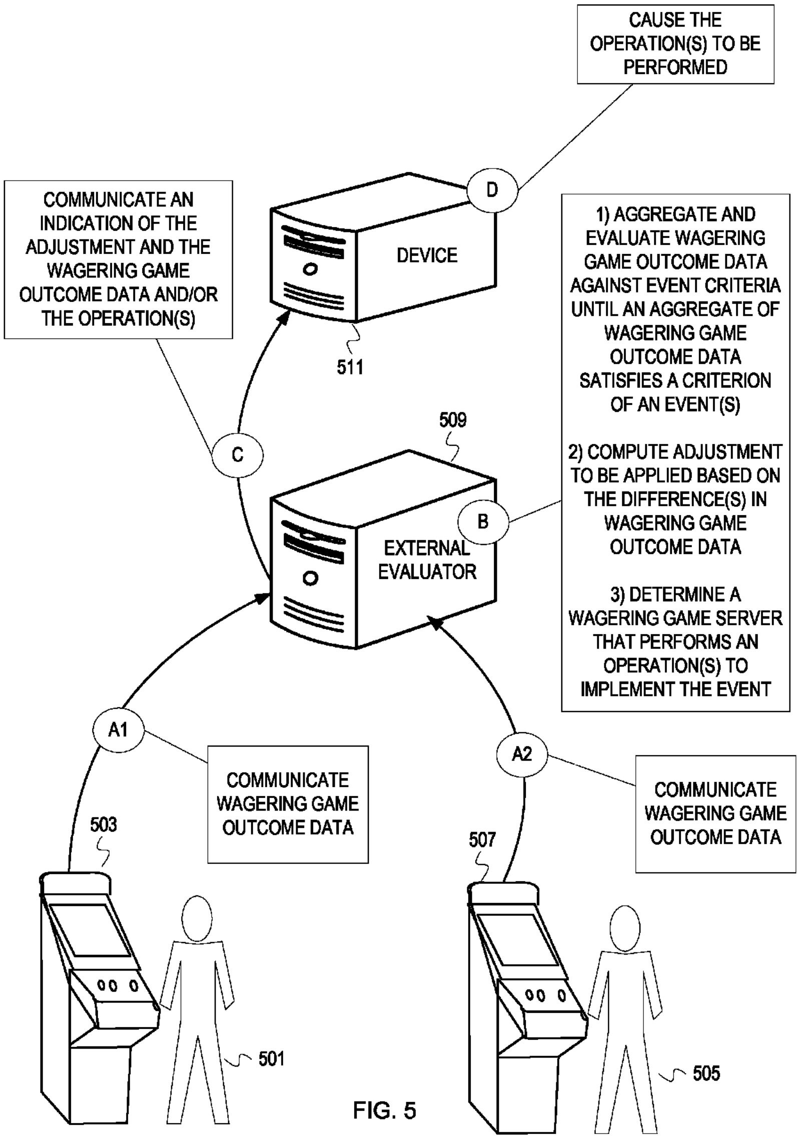
FIG. 5 depicts an example conceptual diagram normalizing of aggregated wagering game outcome data by an external evaluator.

FIG. 5 depicts an example conceptual diagram normalizing of aggregated wagering game outcome data by an external evaluator. A wagering game establishment system comprises wagering game machines 503, 507, an external evaluator 509, and a device 511 (e.g., display controller, portal progressive game controller, etc.). A player 501 plays at the wagering game machine 503 and a player 505 plays at the wagering game machine 507.

At stages A1 and A2, the wagering game machine 503 and the wagering game machine 507 respectively communicate wagering game outcome data to the external evaluator.

At stage B, the external evaluator 509 processes the wagering game outcome data from the wagering game machine 503, 507. The external evaluator 509 aggregates and evaluates the wagering game outcome data from the wagering game machine 503, 507. Examples of aggregating the wagering game outcome data include summing wager amounts, combining symbols, matching symbols across players, etc. The external evaluator 509 evaluates the aggregated wagering game outcome data against event criteria until an aggregate of the wagering game outcome data satisfies a criterion of an event(s). The external evaluator 509 computes an adjustment to be applied to an award/event resulting from the wagering game outcome data. For instance, the players 501 and 505 may have wagered different wager amounts (e.g., different denominations, a bet and a max bet, etc.). If criteria at the external evaluator are satisfied by the aggregate of the wagering game outcome data from the electronic wagering game machines 503, 507, then an event/award arising from satisfaction of the criteria can be adjusted based on the differences in the wager amounts. For instance, if an environmental effect results, then it can be scaled in volume and number of lighting displays involved for the player who wagered a greater amount. As another example, if a coupon for a dinner is the award, then the coupon can be increased based on the ratio of the wagered amounts. Embodiments are not limited to basing adjustments on wager amounts. Embodiments can adjust based on awards of a base wagering game. For example, the player 501 may have a greater reward at the machine 503 than the player 505 at the machine 507 regardless of amount wagered. A bigger celebration event (e.g., replicated across more displays and sounds systems) can be performed for the player who wins more. In addition, embodiments may adjust the wagering game outcome data before aggregating or before evaluating against event criteria. For instance, the external evaluator 509 can normalize the symbols of the different wagering games before evaluating against criteria for an event. The external evaluator 509 can translate or map the symbols of Game A on the wagering game machine 503 to the symbols of Game B on the wagering game machine 507. The external evaluator 509 can also translate or map the symbols f Game A and Game B to a set of universal symbols known to the external evaluator 509, symbols of a Game C known to the external evaluator 509, etc. In addition, embodiments can separately evaluate aggregated wagering game outcome data, individual wagering game outcome data, and normalized wagering game outcome data. Assuming criteria for an event are satisfied, the external evaluator 509 determines a wagering game server that performs an operation(s) that implements the event. For example, a wagering game server can maintain state of a treasure hunt or puzzle game. As an illustration, if at least one of two players hit a particular combination of symbols, then the team of players is awarded a puzzle piece for a puzzle, which when completed results in an award to the team.

At stage C, the external evaluator 509 communicates an indication of the normalized wagering game outcome data and/or the operation(s) to the device 511.

At stage D, the device 511 causes the operation(s) to be performed. For instance, a puzzle for the team of players 501 and 505 is updated to reflect award of a new piece. And the device 511 then determines if the puzzle has been completed.

Figure 6:
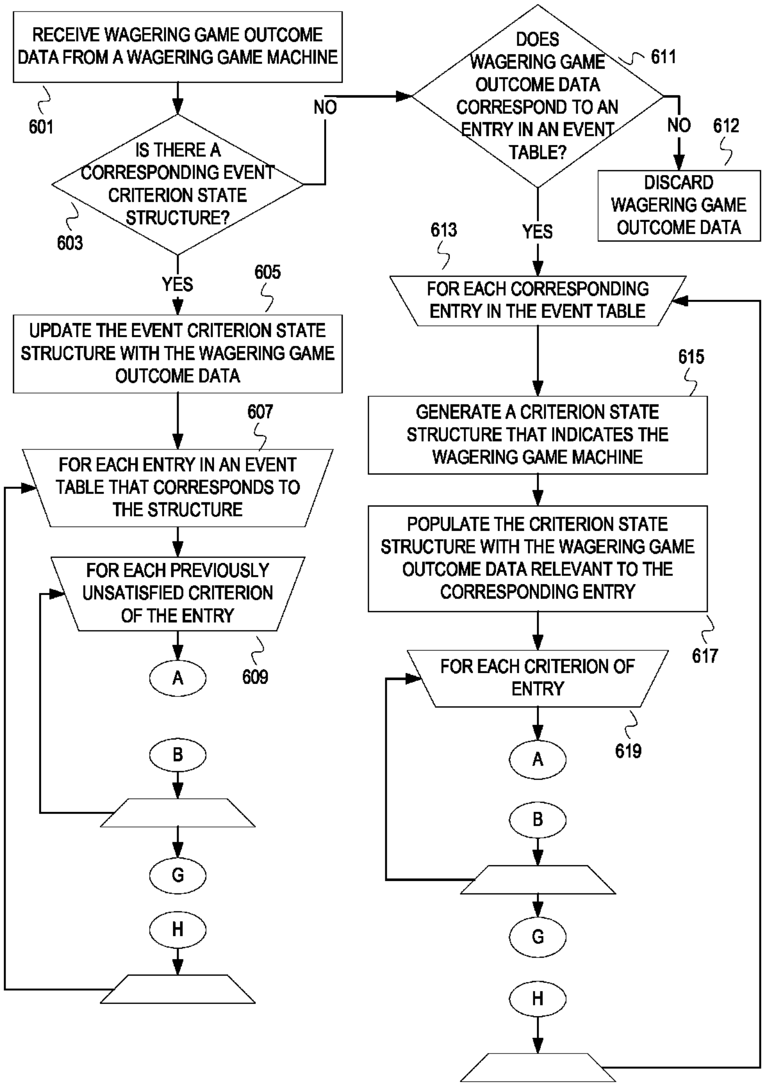
FIGS. 6-7 depict flowcharts of example operations for evaluating wagering game outcome data from multiple wagering game machines.
Figure 7:
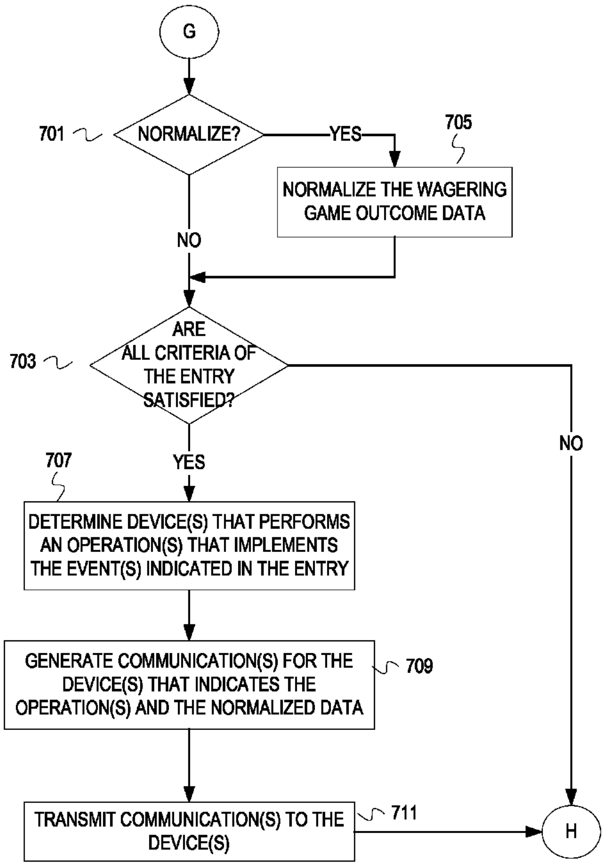

FIGS. 6-7 depict flowcharts of example operations for evaluating wagering game outcome data from multiple wagering game machines. The operations depicted in FIG. 6 are similar to the operations depicted in FIG. 2. At block 601, wagering game outcome data is received from a wagering game machine.

At block 603, it is determined if there is an event criterion state structure that corresponds to the wagering game machine. For instance, an external evaluator accesses a table to determine if an event criterion state structure has been instantiated for the wagering game machine that generated the received wagering game outcome data. Events can have criteria satisfied in one instance and can have criteria that can be satisfied over time with multiple outcomes. The event criterion state structure tracks state of satisfaction of event criteria (e.g., a first criterion has been satisfied, but a second has not been satisfied) on a wagering game machine basis. In the case of wagering game outcome data aggregation, a root node can be created with a reference to a different state structure for each wagering game machine. Embodiments can also create a criterion state structure with records, fields, or entries for each wagering game machine. In addition, the event criterion state structure can indicate relevant wagering game machines and compact or aggregate the outcome data (e.g., wager amounts, awards, symbols, etc.) into fields shared across wagering game machines. Embodiments can also create a first structure that identifies members of a group of wagering game machines, and then create a criterion state structure identified by a group identifier, group name, and/or reference from the group structure. If an event criterion state structure has been instantiated for the wagering game machine, then control flows to block 605. Otherwise, control flows to block 611.

At block 611, it is determined if the wagering game outcome data corresponds to an entry in an event table. For instance, the external evaluator can determine if the wagering game outcome data indicates a game type (e.g., video poker, video slot, etc.) that indexes or keys an entry in the event table. Although the illustration refers to a table, embodiments are not limited to a table structure and can utilize any of a variety of data structures and hardware to associate an event with a criterion or criteria. In addition, multiple events can index into or be associated with a same set of rules and/or criteria. If the wagering game outcome data corresponds to an entry in the event table, then control flows to block 613. If not, then control flows to block 612.

At block 612, the wagering outcome data is discarded. Embodiments are not, however, required to discard the wagering game outcome data. Embodiments can use the wagering game outcome data to update logs, track outcomes, compute statistics, etc.

At block 613, a loop begins for each entry in the event table that corresponds to the wagering game outcome data.

At block 615, a criterion state structure is generated that indicates the wagering game machine.

At block 617, the criterion state structure is populated with wagering game outcome data that is relevant to the corresponding entry. Embodiments can populate the structure with a reference to the wagering game outcome data, a reference to a portion of the wagering game outcome data, etc. Embodiments can generate the criterion state structure based on all criteria for an entry, for example, by calling a function aware of the criteria. Embodiments can also create an initial criterion state structure with a record or field for the first encountered criterion, and update the structure as more criterion are encountered. Embodiments can also create the criterion state structure with an index or reference into the corresponding entry of the event table.

At block 617, a nested loop begins for each criterion of the entry. Control flows from block 617 to block 301 of FIG. 3. From either block 303 or block 305, control returns to block 619 for the next criterion of the entry, if any.

After the criteria of the current entry have been evaluated, control flows to block 701 of FIG. 7.

At block 701, it is determined if the wagering game outcome data is to be normalized. For instance, a game identifier may be used to select a table that maps symbols indicated in the wagering game outcome data to a different set of symbols. If the wagering game outcome data is to be normalized, then control flows to block 705. Otherwise, control flows to block 703.

At block 705, the wagering game outcome data is normalized acros. Embodiments can also compute an adjustment for an award or awards. Control flows from block 705 to block 703.

At block 703, it is determined if all of the criteria of the corresponding entry are satisfied. If so, then control flows to block 707. Otherwise, control flows to block 613 for the next corresponding entry, if any.

At block 707, a device(s) that performs an operation(s) that implements the event(s) indicated in the entry is determined. For instance, an external evaluator determines that operations to implement a celebration event are performed by an audio controller and a LED display. As another example, the external evaluator determines a network address of a server that implements order submission and account debiting operations to implement a hospitality event.

At block 709, a communication(s) that indicates the operation(s) and the normalized data is generated. The communication is for the device(s) determined to perform the operation (s). As examples, an external evaluator can construct a message with operation codes or name of procedures or functions to be executed by the device(s). An external evaluator can also call a function or procedure that populates a template message with operation codes or API calls, and a network address of the device(s) that will use the operation codes or make the API calls.

At block 711, the communication is transmitted to the device(s). An external evaluator can transmit the communication as a network packet, in an e-mail message, incidental to executing an API function, by passing the communication to a process that handles transmission, etc. Control flows from block 711 to block 613 for the next corresponding entry, if any.

If control flowed to block 605 from block 603, then the criterion state structure that corresponds to the wagering game machine is updated with the wagering game outcome data at block 605.

At block 607, a loop begins for each entry in an event table that corresponds to the criterion state structure.

At block 609, a nested loop begins for each previously unsatisfied criterion of the entry that corresponds to the event criterion state structure. From block 609, control flows to block 301 of FIG. 3. From either block 303 or block 305, control returns to block 609 for the next previously unsatisfied criterion of the entry, if any.

After the criteria of the current corresponding entry have been inspected, control flows to block 701 of FIG. 7. Control returns from block 701 or block 711 to block 607 for a next corresponding entry, if any.

In embodiments, the operations for external evaluation functionality can be performed by executing instructions residing on machine-readable media (e.g., software), while in other embodiments, the operations can be performed by hardware and/or other logic (e.g., firmware). In addition, the flowcharts depicted above should not be used to limit embodiments. Various ones of the operations depicted in the flowcharts can be performed in series, in parallel, in a different order, etc. In addition, embodiments can perform less than all the operations shown in any flow diagram or additional operations not shown in any flow diagram. Examples of additional operations include retrieving additional data, subsequent exchanges between the external evaluator and a device implementing operations for an event, etc. To illustrate, assume a team of players have hit all symbols in their separate base wagering games to win awards in a portal bonus game that awards beverages. But only players who have been platinum for more than a year are eligible for the award. The external evaluator can perform operations to retrieve additional data about the players from their player accounts to determine their eligibility. After the external evaluator determines those players on the winning team who are eligible for the award, the external evaluator and/or another device can perform a second set of operations to determine drink preferences of the eligible winning members of the team. The external evaluator can use their player account data to determine their drink preferences. The external evaluator or another device can also prompt the team members for drink preference information (e.g., prompt because no preference was designated in their player account, prompt for confirmation of the preference, etc.). After determining the drink preferences of the eligible winning players, the external evaluator can then communicate the preferences to a device that handles hospitality services and/or the device managing the bonus portal game.

External Evaluator Architectures

Figure 8:
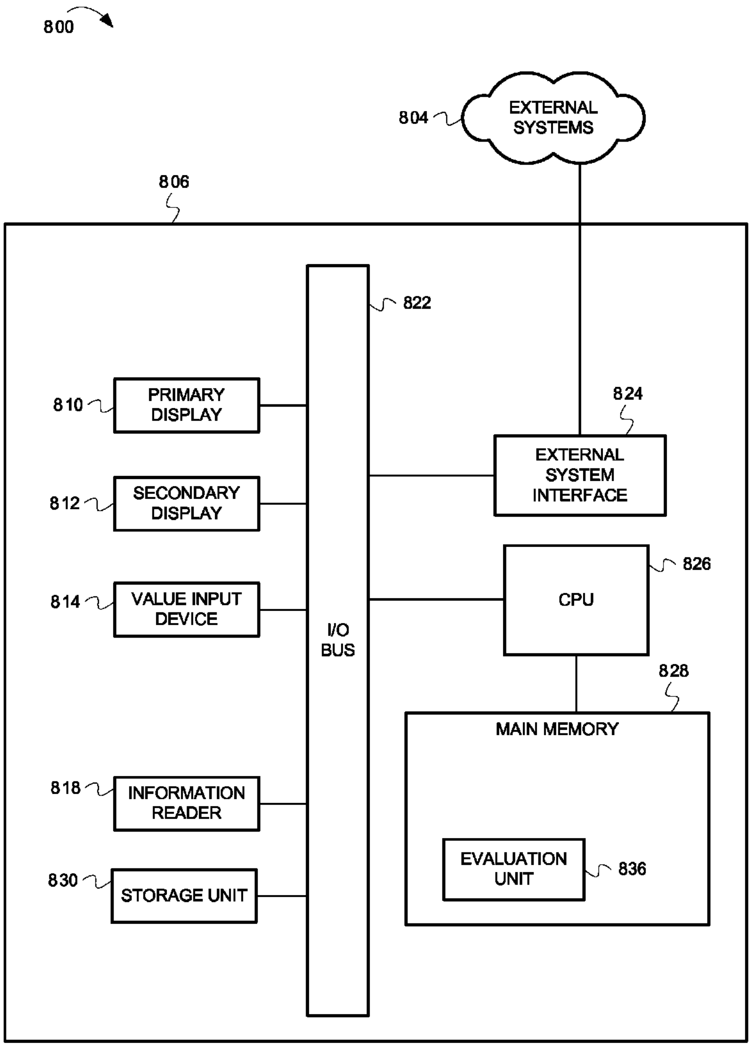
FIG. 8 is a block diagram illustrating an example external evaluator architecture.

FIG. 8 is a block diagram illustrating an example external evaluator architecture. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 encodes an evaluation unit 836 that causes the CPU 826 to perform functionality for evaluating wagering game outcome data against event criteria as described above.

The CPU 826 is also connected to an input/output (I/O) bus 822, which can include any suitable bus technologies, such as an AGTL+ frontside bus and a PCI backside bus. The I/O bus 822 is connected to a primary display 810, secondary display 812, value input device 814, information reader 818, and storage unit 830. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example external evaluator architecture, this section continues with a discussion wagering game networks.

Wagering Game Networks

Figure 9:
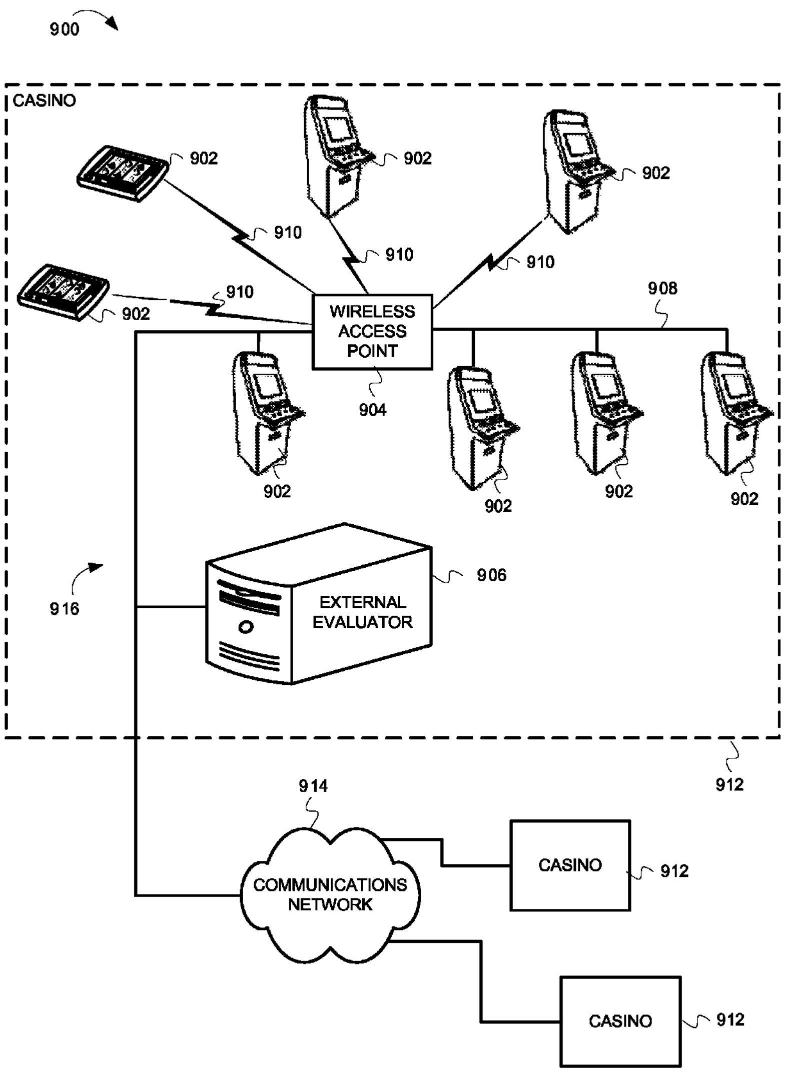
FIG. 9 is a block diagram illustrating a wagering game network 900, according to example embodiments of the invention.

FIG. 9 is a block diagram illustrating a wagering game network 900, according to example embodiments of the invention. As shown in FIG. 9, the wagering game network 900 includes a plurality of casinos 912 connected to a communications network 914.

Each casino 912 includes a local area network 916, which includes an access point 904, an external evaluator 906, and wagering game machines 902. The access point 904 provides wireless communication links 910 and wired communication links 908. The wired and wireless communication links can employ any suitable connection technology, such as Bluetooth, 802.11, Ethernet, public switched telephone networks, SONET, etc. In embodiments, the external evaluator 906 evaluates wagering game outcome data from the wagering game machines 902 against event criteria. The external evaluator 906 then communicates operations to implement events to other devices in the network (not depicted) (e.g., a bonus game server, an environment controller, etc.).

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, either the wagering game machines 902 (client) or the external evaluator 906 can provide functionality that is not directly related to game play. For example, account transactions and account rules may be managed centrally (e.g., by the external evaluator 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a first wagering game machine of a plurality of wagering game machines, said method comprising:

receiving, via a value input device of the first wagering game machine, money for placement of wagers in a first wagering game presented at the first wagering game machine;

determining first data from the first wagering game, wherein the first data corresponds to a first outcome of the first wagering game based on a wager made in the first wagering game using the received money;

receiving, via a network communication interface of the first wagering game machine, second data from a second wagering game at a second wagering game machine of the plurality of wagering game machines, wherein the second data corresponds to a second outcome of the second wagering game;

automatically aggregating, by the first wagering game machine, the first data and the second data, forming an aggregated game outcome;

evaluating, by the first wagering game machine, the aggregated game outcome against criteria for a plurality of events for the aggregated game outcome to determine whether at least one of the plurality of events is triggered, wherein the criteria is separate from first game rules for the first wagering game and separate from second game rules for the second wagering game;

determining, by the first wagering game machine, based on the evaluating, that the aggregated game outcome satisfies at least a portion of the criteria defined for a first event of the plurality of events;

determining one or more devices that perform one or more operations that, at least partially, implement the first event after said determining that the aggregated game outcome satisfies the at least the portion of the criteria;

causing a first device of the one or more devices associated with the first wagering game machine to present one or more of a greater volume or a greater lighting output for a gaming effect than a second device of the one or more devices associated with the second wagering game machine based on the first data satisfying more of the at least the portion of the criteria than the second data; and awarding, via a monetary output device of the first wagering game machine, a greater monetary reward for the first wagering game machine than for the second wagering game machine based on the first data satisfying more of the at least the portion of the criteria than the second data.

2. The method of claim 1, wherein the first event is indicated in a reward table that is separate from a first pay table for the first wagering game and separate from a second pay table for the second wagering game.

3. The method of claim 1, wherein the aggregating the first data and the second data, forming the aggregated game outcome, comprises combining a first symbol from the first outcome with a second symbol from the second outcome, forming an aggregated symbol combination that is different from a first symbol combination of the first outcome and different from a second symbol combination of the second outcome.

4. The method of claim 1, wherein the aggregating the first data and the second data, forming the aggregated game outcome, comprises combining a first wager amount from the first wagering game with a second wager amount from the second wagering game, forming an aggregated wager total.

5. The method of claim 4, wherein the determining that the aggregated game outcome satisfies the at least the portion of the criteria comprises determining that the aggregated wager total satisfies a total wager criterion associated with the first event, and wherein the first event comprises paying a reward.

6. The method of claim 5, wherein the determining that the aggregated wager total satisfies the total wager criterion comprises determining a degree to which the first wager amount contributes to the total wager criterion, and determining a degree to which the second wager amount contributes to the total wager criterion, and further comprising apportioning the reward to the first wagering game machine and the second wagering game machine proportional to the degree to which the first wager amount contributes to the total wager criterion and proportional to the degree to which the second wager amount contributes to the total wager criterion.

7. The method of claim 1 further comprising:

determining a first degree of contribution provided by the first data to satisfying the at least the portion of the criteria;

determining a second degree of contribution provided by the second data to satisfying the at least the portion of the criteria; and apportioning an indication of the first event proportional to the first degree of contribution and the second degree of contribution.

8. The method of claim 7, wherein the apportioning the indication of the first event proportional to the first degree of contribution and the second degree of contribution comprises:

instructing the first device to present a first degree of the gaming effect proportional to the first degree of contribution; and instructing, via the network communication interface, the second device to present a second degree of the gaming effect proportional to the second degree of contribution.

9. The method of claim 1 further comprising:

aggregating the first data and the second data after determining the first data and the second data individually fail to satisfy the at least the portion of the criteria.

10. One or more non-transitory, machine-readable storage media having program instructions stored thereon, which when executed by an electronic processing unit of a first wagering game machine of a plurality of wagering game machines, cause the first wagering game machine to perform operations comprising:

receiving, via a value input device of the first wagering game machine, money for placement of wagers in a first wagering game presented at the first wagering game machine;

determining first data from the first wagering game, wherein the first data corresponds to a first outcome of the first wagering game based on a wager made in the first wagering game using the received money;

receiving, via a network communication interface of the first wagering game machine, second data from a second wagering game at a second wagering game machine of the plurality of wagering game machines, wherein the second data corresponds to a second outcome of the second wagering game;

automatically aggregating, by the first wagering game machine, at least a portion of the first outcome and at least a portion of the second outcome, forming an aggregated game outcome;

evaluating by the first wagering game machine, the aggregated game outcome against criteria for a plurality of events for the aggregated game outcome to determine whether at least one of the plurality of events is triggered, wherein the criteria is separate from first game rules for the first wagering game and separate from second game rules for the second wagering game;

determining by the first wagering game machine, based on the evaluating, that the aggregated game outcome satisfies at least a portion of the criteria defined for a first event of the plurality of events;

determining one or more devices that perform one or more operations that, at least partially, implement the first event after said determining that the aggregated game outcome satisfies the at least the portion of the criteria; and causing a first device of the one or more devices to present one or more of a greater volume or a greater lighting output for a gaming effect than a second device of the one or more devices associated with the second wagering game machine based on the at least the portion of the first outcome satisfying more of the at least the portion of the criteria than the at least the portion of the second outcome; and awarding, via a monetary output device of the first wagering game machine, a greater monetary reward for the first wagering game machine than for the second wagering game machine based on the at least the portion of the first outcome satisfying more of the at least the portion of the criteria than the at least the portion of the second outcome.

11. The one or more non-transitory, machine-readable storage media of claim 10, wherein the operations for aggregating the at least the portion of the first outcome and the least the portion of the second outcome, forming the aggregated game outcome, includes operations comprising combining a first symbol from the first outcome with a second symbol from the second outcome, forming an aggregated symbol combination that is different from a first symbol combination of the first outcome and different from a second symbol combination of the second outcome.

12. The one or more non-transitory, machine-readable storage media of claim 10, wherein the operations for aggregating the at least the portion of the first outcome and the least the portion of the second outcome, forming the aggregated game outcome, includes operations comprising combining a first wager amount from the first wagering game with a second wager amount from the second wagering game, forming an aggregated wager total.

13. The one or more non-transitory, machine-readable storage media of claim 12, wherein the operations for determining that the aggregated game outcome satisfies the at least the portion of the criteria includes operations comprising determining that the aggregated wager total satisfies a total wager criterion associated with the first event, wherein the first event comprises paying a reward.

14. The one or more non-transitory, machine-readable storage media of claim 13, wherein the operations for determining that the aggregated wager total satisfies the total wager criterion includes operations comprising determining a degree to which the first wager amount contributes to the total wager criterion, and determining a degree to which the second wager amount contributes to the total wager criterion, and said operations further comprising apportioning the reward to the first wagering game machine and the second wagering game machine proportional to the degree to which the first wager amount contributes to the total wager criterion and proportional to the degree to which the second wager amount contributes to the total wager criterion.

15. The one or more non-transitory, machine-readable storage media of claim 10 said operations further comprising:

determining a first degree of contribution provided by the at least the portion of the first outcome to satisfying the at least the portion of the criteria;

determining a second degree of contribution provided by the at least the portion of the second outcome to satisfying the at least the portion of the criteria; and apportioning an indication of the first event proportional to the first degree of contribution and the second degree of contribution.

16. The one or more non-transitory, machine-readable storage media of claim 10, wherein each of the plurality of wagering game machines comprises one or more of at least one monetary input device configured to add monetary funds to a casino wagering game session balance, a wager placement device configured to wager a portion of wagering game funds from a casino wagering game session balance, or a rewards generation device configured to award rewards associated with a casino wagering game outcome to a casino wagering game session balance.

17. A first wagering game machine comprising:

an electronic processing unit;

a value input device;

a monetary output device;

a network communication interface; and a memory storage unit configured to store instructions, which are executable by the electronic processing unit to cause the first wagering game machine to, receive, via the value input device, money for placement of wagers in a first wagering game presented at the first wagering game machine, determine first data from the first wagering game, wherein the first data corresponds to a first outcome of the first wagering game;

receive, via the network communication interface, second data from a second wagering game presented at a second wagering game machine, wherein the second data corresponds to a second outcome of the second wagering game, automatically aggregate a portion of the first outcome and a portion of the second outcome, to form an aggregated game outcome, electronically evaluate the aggregated game outcome against criteria for a plurality of events for the aggregated game outcome to determine whether at least one of the plurality of events is triggered, wherein the criteria is separate from first game rules for the first wagering game and separate from second game rules for the second wagering game, determine that the aggregated game outcome satisfies at least a portion of the criteria defined for a first event of the plurality of events;

determine one or more devices that perform one or more operations that, at least partially, implement the first event after said determining that the aggregated game outcome satisfies the at least the portion of the criteria, and cause a first device of the one or more devices associated with the first wagering game machine, to present one or more of a greater volume or a greater lighting output for a gaming effect than a second device of the one or more devices associated with the second wagering game machine based on the portion of the first outcome satisfying more of the at least the portion of the criteria than the portion of the second outcome, and award, via the monetary output device, a greater monetary reward to the first wagering game machine than to the second wagering game machine based on the portion of the first outcome satisfying more of the at least the portion of the criteria than the portion of the second outcome.

18. The first wagering game machine of claim 17, wherein the instructions to cause the first wagering game machine to aggregate the portion of the first outcome and the portion of the second outcome, to form the aggregated game outcome, includes instructions which are executable by the electronic processing unit to cause the first wagering game machine to combine a first symbol from the first outcome with a second symbol from the second outcome to form an aggregated symbol combination that is different from a first symbol combination of the first outcome and different from a second symbol combination of the second outcome.

19. The first wagering game machine of claim 17, wherein the instructions to cause the first wagering game machine to aggregate the portion of the first outcome and the portion of the second outcome, to form the aggregated game outcome, includes instructions which are executable by the electronic processing unit to cause the first wagering game machine to combine a first wager amount from the first wagering game with a second wager amount from the second wagering game to form an aggregated wager total.

20. The first wagering game machine of claim 17, wherein the memory storage unit is configured to store instructions which are executable by the electronic processing unit to cause the first wagering game machine to:

determine a first degree of contribution provided by the portion of the first outcome to satisfying the at least the portion of the criteria;

determine a second degree of contribution provided by the portion of the second outcome to satisfying the at least the portion of the criteria; and apportion an indication of the first event proportional to the first degree of contribution and the second degree of contribution.

21. The first wagering game machine of claim 20, wherein the instructions to cause the first wagering game machine to apportion the indication of the first event proportional to the first degree of contribution and the second degree of contribution includes instructions which are executable by the electronic processing unit to cause the first wagering game machine to:

instruct the first device to present a first degree of the gaming effect proportional to the first degree of contribution; and instruct, via the network communication interface, the second device to present a second degree of the gaming effect proportional to the second degree of contribution.

22. The first wagering game machine of claim 17, wherein each of the first wagering game machine and the second wagering game machine comprises one or more of at least one monetary input device configured to add monetary funds to a casino wagering game session balance, a wager placement device configured to wager a portion of wagering game funds from a casino wagering game session balance, or a rewards generation device configured to award rewards associated with a casino wagering game outcome to a casino wagering game session balance.

* * * * *